(12) United States Patent
Smith et al.

(10) Patent No.: US 6,602,533 B1
(45) Date of Patent: Aug. 5, 2003

(54) METHOD AND APPARATUS FOR FRYING POTATO CHIPS AND RELATED FOODSTUFFS

(75) Inventors: Christopher A. Smith, Toronto (CA); Raymond Kenneth Woodey, Kitchener (CA)

(73) Assignee: Chippery Potato Chip Factory, Inc., Toronto (CA)

( * ) Notice: Subject to any disclaimer, the term of this patent is extended or adjusted under 35 U.S.C. 154(b) by 0 days.

(21) Appl. No.: 09/554,345

(22) PCT Filed: Nov. 10, 1998

(86) PCT No.: PCT/CA98/01054
§ 371 (c)(1),
(2), (4) Date: Sep. 18, 2000

(87) PCT Pub. No.: WO99/23893
PCT Pub. Date: May 20, 1999

(30) Foreign Application Priority Data

Nov. 12, 1997 (CA) ................................................ 2220908

(51) Int. Cl.[7] .................................................. A47J 37/12
(52) U.S. Cl. ...................... 426/438; 426/518; 426/523; 99/329 P; 99/338; 99/353; 99/404; 99/407; 99/537; 99/DIG. 10; 222/54; 222/146.2; 83/76; 83/932
(58) Field of Search ........................... 99/329 R, 329 P, 99/329 RT, 333, 334, 338, 353, 404–407, DIG. 10, 537–538; 222/54, 146.1–146.5; 83/57–58, 72–76, 403.1, 416, 932; 426/438, 518, 523

(56) References Cited

U.S. PATENT DOCUMENTS

| | | | |
|---|---|---|---|
| 3,280,723 A | 10/1966 | Hughes et al. | 99/353 |
| 3,736,862 A | 6/1973 | Crommelijnek | 99/353 |
| 3,763,764 A | 10/1973 | Schy | 99/353 |
| 4,152,975 A | 5/1979 | Jones | 99/352 |
| 4,228,730 A | 10/1980 | Schindler et al. | 99/329 R |
| 4,366,749 A | 1/1983 | Caridis et al. | 99/339 |
| 4,488,478 A | 12/1984 | Leeper | 99/330 |
| 4,546,684 A | 10/1985 | Bellerose | 83/355 |
| 4,706,556 A | 11/1987 | Wallace et al. | 99/330 |
| 4,863,750 A | 9/1989 | Pawlak et al. | 426/438 |
| 4,923,705 A | 5/1990 | Mottur et al. | 426/438 |
| 4,929,461 A | 5/1990 | Schonauer et al. | 426/438 |
| 5,137,740 A | 8/1992 | Benson et al. | 426/438 |
| 5,193,440 A | 3/1993 | Frank | 99/330 |
| 5,352,866 A | * 10/1994 | Cartwright et al. | 219/497 |
| 5,454,297 A | 10/1995 | Phillips | 99/405 |
| 5,580,598 A | 12/1996 | Benson et al. | 426/438 |

FOREIGN PATENT DOCUMENTS

DE  195 48 209 C1  7/1997
GB  1263923  2/1972

* cited by examiner

Primary Examiner—Keith Hendricks
Assistant Examiner—Drew Becker
(74) Attorney, Agent, or Firm—Ohlandt, Greeley, Ruggiero & Perle, L.L.P.

(57) ABSTRACT

Apparatus for preparing potato chips. The apparatus has a slicer for the slicing of potatoes, means for conveying sliced potatoes through a heated oil bath and for removal of cooked potato chips from the heated oil bath. The slicer has a knife blade that rotates at the lower end of a hopper for potatoes, the speed of rotation of the knife blade being controlled so that the knife blade is stationary when the temperature of the oil bath is below a predetermined temperature, and the speed of rotation of the knife blade being further controlled so that the speed of rotation increases as the temperature is increased above said predetermined temperature. The slicer preferably has a chute that tapers to an orifice above the slicer blade, with the orifice tapering in the direction of rotation of the slicer blade. The apparatus may also be adapted for use with corn chips or tortilla chips.

34 Claims, 4 Drawing Sheets

METHOD AND APPARATUS FOR FRYING POTATO CHIPS AND RELATED FOODSTUFFS

The present invention relates to a method and apparatus for the frying of potato chips, and other foodstuffs, and especially to such a method and apparatus that is compact and intended for use on demand and in a fast food outlet e.g. in shopping malls, food stores, restaurants, stadiums, amusement parks and the like.

Methods and apparatus for the manufacture of potato chips are known. Such methods usually involve the slicing of the potato and the insertion of the sliced potato into heated oil to effect frying of the potato chip, The potato chip is conveyed through the oil, normally being submerged for at least part of the period of time that the potato chip is in the oil, and then removed from the frying oil. In most instances, the potato chip is packaged in appropriate containers or packages and shipped for subsequent sale to the consumer. Such sale may not occur for several weeks or months.

The methods for the preparation of potato chips include methods in which the temperature of the oil is varied during the process or in which the potato chip is pre-treated prior to being immersed in the frying oil. Examples of such methods include the methods disclosed in U.S. Pat. Nos. 4,366,749, 4,863,750, 4,929,461, 5,137,740 and 5,580,598.

Attempts have been made to produce potato chips on a smaller scale, with the intention that the potato chips would be made available to the consumer shortly after preparation. In particular, attempts have been made to provide freshly made potato chips to the consumer in fast food outlets, using apparatus that is substantially smaller than is used in large scale manufacturing processes for potato chips. Such a method and apparatus is disclosed in U.S. Pat. No. 4,706,556. The method of the patent included heat transfer bars in the bottom of the tank, or kettle, used in the frying to improve efficiency of the process, a potato washing station and variable speed motors for both the potato slicer and the conveyer system so that the speed of the slicer and conveyer could be coordinated with the volume of potato chips being processed. It is understood that, in practice, the apparatus of this patent provided inconsistent product, at least in part due to control mechanisms used in the apparatus.

Apparatus for preparing cooking potato chips is disclosed in U.S. Pat. No. 4,152,975. The apparatus has a conveyor for receiving thin slices cut from a raw potato and conveying the slices along a sinuous path through a heated oil bath. Apparatus in which partially cooked potato slices are re-immersed in cooking oil is described in U.S. Pat. No. 5,193,440. U.S. Pat. No. 3,763,764 describes apparatus for the cooking of taco shells, including means for forming the shells into shape and then cooking the shells. GB Patent 1263923 relates to a process for the treating of yeast products to remove characteristic odours involving contacting yeast material with an edible oil or fat at elevated temperature. U.S. Pat. No. 4,228,730 describes a process for cooking french fried (potato chips) involving conveying frozen potato pieces from a hopper to a bath. A second conveyor submerges the potato pieces during cooking.

U.S. Pat. No. 4,546,684 discloses a potato slicer having a feed tube and an upwardly tapered wall that wedges a potato during slicing. DE 19548209 describes a slicer with a flap for holding vegetables in position during slicing.

Apparatus for preparing potato chips is disclosed in U.S. Pat. No. 3,280,723. The apparatus includes a potato slicer having a potato chute with a smooth inner surface and side walls with a helical contour that converge at the end of the chute. It is stated that the helical walls are arranged so that the curved and narrowing passage leads the potatoes in the direction of rotation of the cutting blade.

An improved method for the manufacture of potato chips so as to provide fresh potato chips to the consumer, especially for use in a fast food outlet, or in other food outlets, is required. Such a method and apparatus has now been found.

Accordingly, one aspect of the present invention provides apparatus for preparing potato chips, said apparatus having a slicer for the slicing of potatoes, means for conveying sliced potatoes through a heated oil bath and for removal of cooked potato chips from the heated oil bath, said slicer comprising a knife blade that rotates at the lower end of a hopper for potatoes, the knife blade being adapted to slice potatoes, the sliced potatoes being fed to the heated bath, the speed of rotation of the knife blade being adapted to be controlled so that the knife blade is stationary when the temperature of the oil bath is below a pre-determined temperature, and the speed of rotation of the knife blade being adapted to be further controlled so that the speed of rotation increases as the temperature is increased above said pre-determined temperature.

A further aspect of the present invention provides a method for the preparation of potato chips in apparatus comprising a slicer for the slicing of potatoes, means for conveying sliced potatoes through a heated oil bath and for removal of cooked potato chips from the heated oil bath, said slicer comprising a knife blade that rotates at the lower end of a hopper for potatoes, the knife blade being adapted to slice potatoes, the sliced potatoes being fed to the heated bath, said method comprising causing the knife blade to be stationary when the temperature of the oil bath is below a pre-determined temperature, rotating the knife blade when said temperature is at or above said pre-determined temperature and increasing the speed of rotation of the knife blade as the temperature is increased above said pre-determined temperature.

A further aspect of the invention provides a slicer for preparing potato chips, comprising:
    a rotatable disc having a radial slot therein and a slicing blade projecting above the plane of the disc; and
    a chute for downwardly conveying potatoes to said rotatable disc;
    an orifice between said chute and said rotatable disc, said orifice having a shape that decreases in depth in the direction of rotation of the rotatable disc.

In a preferred embodiment of the present invention, the orifice is in an ovate shape of decreasing depth in the direction of rotation of the slicing blade.

In a further preferred embodiment of the slicer, the chute is at an acute angle with respect to the direction of rotation of the disc, and in particular terminates in a housing covering and conforming to the said ovate shape.

Another aspect of the invention provides apparatus for the preparing of potato chips, having a potato slicer, a heated oil bath, a conveyor for the conveying of potato slices through the heated oil bath and means for the removal of cooked potato chips from the heated oil bath, in which the slicer for preparing said potato chips comprises (i) a rotatable disc having a radial slot therein and a slicing blade projecting above the plane of the disc; and (ii) a chute for downwardly conveying potatoes to said rotatable disc;
    an orifice between said chute and said rotatable disc, said orifice having a shape that decreases in depth in the direction of rotation of the rotatable disc.

In a preferred embodiment of the present invention, the orifice is in an ovate shape of decreasing depth in the direction of rotation of the slicing blade.

Another aspect of the invention provides a method for the preparing of potato chips in apparatus having a potato slicer, a heated oil bath, a conveyor for the conveying of potato slices through the heated oil bath and means for the removal of cooked potato chips from the heated oil bath, in which the slicer for preparing said potato chips comprises (i) a rotatable disc having a radial slot therein and a slicing blade projecting above the plane of the disc; and (ii) a chute for downwardly conveying potatoes to said rotatable disc;

an orifice between said chute and said rotatable disc, said orifice having a shape that decreases in width in the direction of rotation of the rotatable disc;

said method comprising feeding potatoes into the chute of the potato slicer, rotating said disc having the blade extending upwards therefrom by means of which each said potato to be sliced is urged into the narrow end of the tear drop and sliced by said blade, submerging said sliced potato chip in the heated oil bath and removing said potato chip when cooked.

In a preferred embodiment of the present invention, the orifice is in an ovate shape of decreasing width in the direction of rotation of the rotatable disc.

A chute for downwardly conveying potatoes to said rotatable disc;

an orifice between said chute and said rotatable disc, said orifice having a shape that decreases in width in the direction of rotation of the rotatable disc.

In a preferred embodiment of the present invention, the orifice is in an ovate shape of decreasing width in the direction of rotation of the slicing blade.

In another embodiment, the chute has an elbow therein.

Another aspect of the invention provides apparatus for preparing foodstuffs, said apparatus having means for conveying said foodstuffs through a heated oil bath and for removal of cooked foodstuffs from the heated oil bath, said apparatus having a hopper for the foodstuffs and a conveyor belt for feeding foodstuffs to the heated bath, the speed of conveying of the foodstuffs being controlled so that the conveyor is stationary when the temperature of the oil bath is below a pre-determined temperature, and the speed of the conveyor being further controlled so that the speed increases as the temperature is increased above said pre-determined temperature.

A further aspect provides a method for the preparation of foodstuffs in apparatus comprising means for conveying the foodstuffs through a heated oil bath and for removal of cooked foodstuffs from the heated oil bath, said foodstuffs being fed to the heated bath on a conveyor, said method comprising causing the conveyor to be stationary when the temperature of the oil bath is below a pre-determined temperature, and to feed foodstuffs when said temperature is at or above said pre-determined temperature and increasing the speed of conveying the foodstuffs as the temperature is increased above said pre-determined temperature.

In preferred embodiments of the invention, the foodstuffs are corn chips or tortilla chips.

BRIEF DESCRIPTION OF THE DRAWINGS

The present invention is illustrated by the embodiments shown in the drawings, in which:

FIG. 6 is a schematic representation of a feed system for corn chips, tortilla chips or the like.

DETAILED DESCRIPTION OF THE INVENTION

Figure 1:
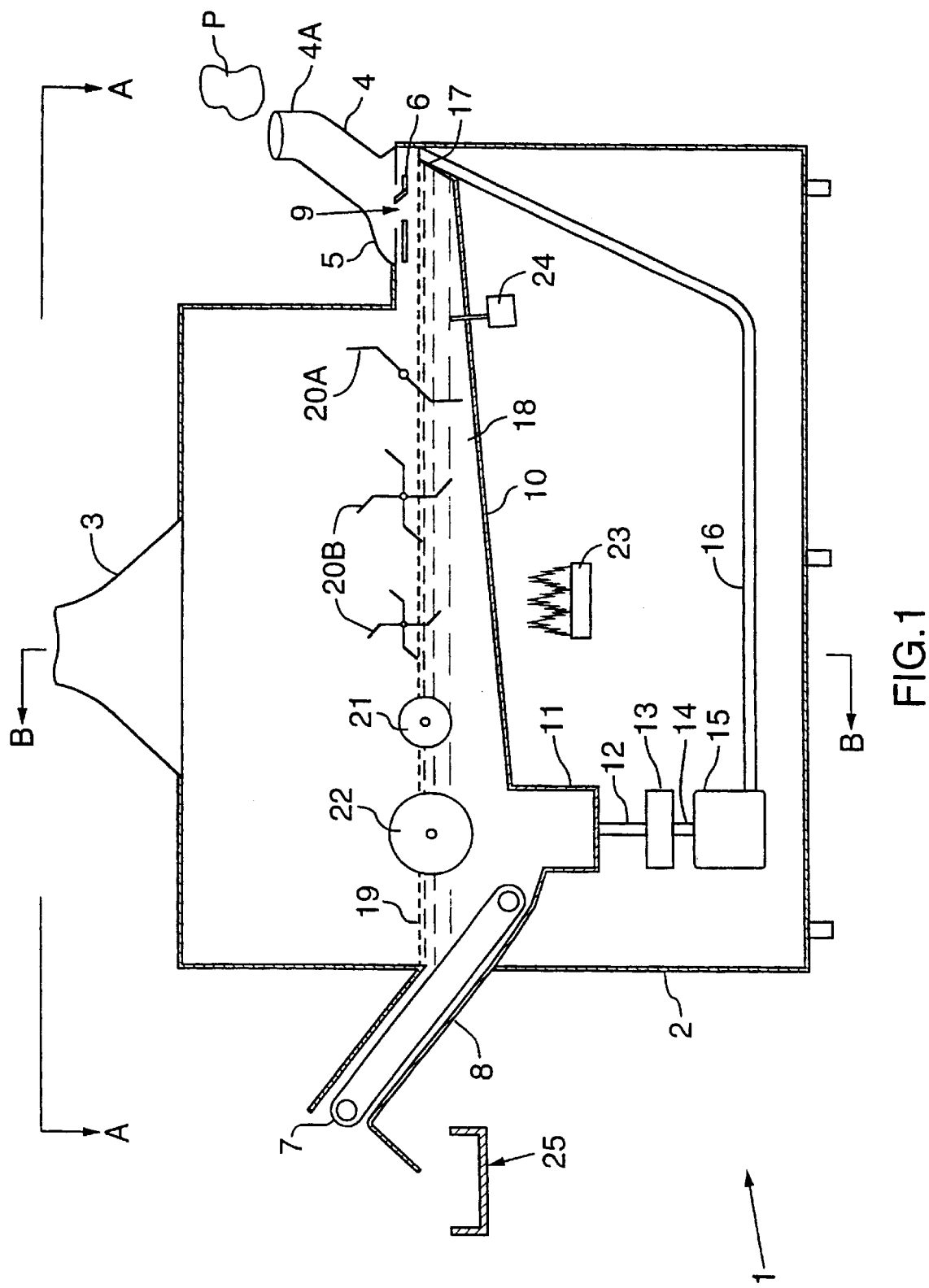
FIG. 1 is a schematic representation of an apparatus for frying potato chips.

Referring to FIG. 1, apparatus for the frying of potato chips is generally indicated by 1. Apparatus 1 has a housing 2 from which hood 3 extends upwardly. Housing 2 has slicer chute 4 thereon that extends downwardly to slicer base 5.

It will be noted that slicer chute 4 extends upwardly from slicer base 5 at an angle, preferably at an angle of approximately 45°, although the angle may be varied. In addition, slicer chute 4 terminates at its upper end in chute inlet 4A, which is shown as being vertical. Such chute is referred to herein as having an elbow. Although variation may be made in the angles, the intent is to permit a potato to be inserted into chute inlet 4A and fall down chute 4, and also to make it physically difficult and preferably impossible to insert an arm and hand into the chute e.g. to dislodge a potato. The slicer and chute are designed so as to effectively eliminate any need to dislodge a potato, but if that should be necessary, the chute will need to be opened, as described below. Safety switches should be located such that opening the chute automatically stops operation of the slicer and/or operation of the slicer must have stopped before the chute can be opened.

Slicer base 5 and slicer inlet 9 are designed to effect slicing of the potato, as discussed below. Slicer base 5 is located above slicer 6, being separated therefrom by slicer inlet (orifice) 9.

Apparatus 1 has oil pan 10 that extends substantially throughout the length of the apparatus. It will be noted that oil pan 10 slopes downwardly from the end at which slicer 6 is located towards the outlet end, where outlet conveyor 7 extends into housing 2. Outlet conveyor 7 is located within outlet conveyor chute 8.

At its lowest point, beneath conveyor 7, oil pan 10 has oil tank recess 11 extending downwardly. Oil pan recess 11 is connected to oil outlet pipe 12, which in turn is connected to oil filter 13. Oil filter 13 is connected through filter pipe 14 to oil pump 15, and then through pipe 16, or through an electric heat exchanger, to manifold 17. Manifold 17 is located at the end of oil pan 10 under slicer 6. The surface of oil 18 as indicated by oil surface 19, extends from oil manifold 17. Manifold 17 should be designed to provide an even flow of oil into oil pan 10, especially distributing oil across the width of oil pan 10.

A plurality of paddle wheels 20A and 20B are located between slicer 6 and outlet conveyor 7. First chip submerging wheel 21 and second chip submerging wheel 22 are located between the latter of paddle wheels 20B and outlet conveyor 7. In the drawings, three paddle wheels are shown, which is the preferred number of paddle wheels. In addition, paddle wheel 20A is shown as having two paddles, whereas both of paddle wheels 20B have four paddles.

In operation, a potato P that has been previously washed and peeled is inserted into slicer chute 4. Potato P falls down slicer chute 4 and into slicer inlet (orifice) 9. Slicer 6 is rotated so as to slice the potato and form a potato chip. The potato chip becomes deposited in oil 18 in oil pan 10 and is urged in a forward direction by flow of oil from manifold 17 through oil pan 10 towards oil pan recess 11. The flow of oil tends to occur beneath paddle wheels 20A and 20B and chip submerging wheels 21 and 22. Paddle wheels 20A and 20B rotate clockwise, in the view shown in FIG. 1. The slice of potato floats on the surface 19 of oil 18, and comes into contact with paddle wheel 20A. The shape of the paddle is such that the slice of potato is urged forward, and held in position by the paddle wheels in a controlled manner. When the slice is released by the first paddle wheel 20A, it is accepted and retained by the next paddle wheel 20B. As noted above, three paddle wheels 20A and 20B are preferred, although other numbers of paddle wheels could be used, especially with the speed of rotation being adjusted and controlled to provide an acceptable product. The paddle wheels preferably are adapted to be quickly disconnected for cleaning or other purposes.

The use of two paddles, and a spinner, on paddle wheel 20A provides a controlled entry of potato slices, whereas the four paddles on each of paddle wheels 20B ensure continued movement of the potato slices. The paddle wheels also stage the product, so that there is controlled movement of potato chips, especially the time to move a potato chip through the apparatus, and prevent or reduce the likelihood of a jam of potato slices between paddle wheels.

After emerging from the last paddle wheel, the slice of potato is forced under the surface of the oil by first potato chip submerging wheel 21, and then further urged under the surface of the oil by second chip submerging wheel 22. Although the chip submerging wheels are shown in FIG. 1 as being wheels, it is preferred that the wheels be part of a flighted conveyor, especially in which the submerging wheels have a wire mesh conveyor belt thereon for conveying and submerging the potato chips in the oil.

The potato chip is then collected and conveyed out of oil 18 by outlet conveyor 7. Excess oil on the potato chip is drained from the potato chip as it passes up outlet conveyor 7, with the oil running back down outlet conveyor chute 8 and into oil pan 10.

Any particulate matter in oil 18 e.g. small pieces of potato from the slicing of potato P at slicer 6, tends to pass along oil pan 10 e.g. along the downward slope of the bottom of oil pan 10, and become located in oil pan recess 11. Oil 18 is passed from oil pan recess 11 through oil outlet pipe 12 and filtered at filter 13. The oil is then pumped, using pump 15, though pipe 16 to manifold 17. It is understood that the oil would normally be circulated from oil pan 10 through filter 13 and to manifold 17 even if the oil did not contain any particulate matter or did not require cleaning for any other reason.

Oil 18 in oil pan 10 is heated by any convenient means. In the embodiment of FIG. 1, oil 18 is shown as being heated by oil heater 23, which is indicated by being in the form of a gas burner. However, it is to be understood that electrical or other heating methods may be used, including use of electric heat exchangers, provided that the temperature of the oil may be adequately controlled.

The temperature of the oil is monitored by oil temperature probe 24 which may be conveniently located in any part of the system, but is shown as being located in oil 18 at a location near manifold 17, at which the heated oil enters oil pan 10. In an embodiment, two temperature probes are used e.g. at the manifold and at the outlet (discharge) from the pump. Alternate and preferred locations are described below.

In a preferred embodiment of the operation of the apparatus of the present invention, the speed of rotation of slicer 6 is controlled and interrelated with the temperature of the oil 18 in oil pan 10. Thus, oil temperature probe 24 is connected through apparatus (not shown) in FIG. 1 to the variable speed motor (see FIG. 2) that controls the speed of rotation of slicer 6.

The speed of rotation is controlled such that the slicer does not rotate when the temperature of the oil is below a predetermined level. For instance, the control for the slicer could be set so that the slicer would not rotate if the temperature of the oil was below 170° C. When the temperature of oil 18 is increased to the predetermined temperature, slicer 6 would begin to rotate slowly and slice potato P that is in chute 4. In addition, as the temperature of oil 18 in oil pan 10 increases above the predetermined temperature i.e. increases above 170° C. in the above example, the speed of rotation of slicer 6 is increased proportionately. Conversely, if the temperature should fall below the predetermined temperature, then slicer 6 would cease to rotate. Thus, the temperature and speed of rotation of the slicer are coordinated and correlated. Such correlation of the speed of slicer 6 to the temperature of oil 18 ensures that potato slices are not placed in the oil bath if the temperature is below the predetermined temperature, and further increases the rate of production of potato slices as the temperature increases above the predetermined temperature.

While the apparatus would normally have controls to permit an adjustment of the speed of rotation of the paddle wheels 20A and 20B and first and second chip submerging wheels 21 and 22, and there could be some correlation with the temperature of oil 18, there would normally not be a direct correlation of speed of rotation of the paddle wheels and temperature.

The interrelated control of the speed of rotation of slicer 6 with the temperature of oil 18 in oil pan 10 facilitates control of the frying of the potato chip so as to achieve greater consistency in the frying of the potato chips.

It is to be understood that the predetermined temperature for operation of the slicer may be set at any convenient temperature, particularly depending on the properties required in the fried potato chip. It is also understood that there would be a maximum temperature of the oil for operation of the apparatus, above which temperature the apparatus would cease to operate. Such a maximum temperature is utilized to improve consistency of the potato chip obtained, but also provides a safety function by stopping operation of the apparatus e.g. in the event of a failure in any part of the operation of the apparatus but especially in the temperature control system. As an example, such a maximum temperature might be set at about 195° C. In the examples of temperature given herein i.e. operation between temperatures of 170° C. and 195° C., a difference of 25° C., it is understood that the normal control of temperatures in operation of the apparatus would be significantly less than such a range of temperature. As an example, the range of temperature may be controlled to less than 20° C. using the apparatus of the invention.

It is also understood that the normal operation of the potato chip fryer described in FIG. 1 could be an as-required basis or as a continuous operation. The latter is preferred. In operation on an as-required basis e.g. the potato chip fryer would be located in a mall or other fast food outlet where the demand for potato chips would vary with the frequency of the orders for the potato chips. Thus, when a person made an order for potato chips, the required potatoes could be inserted into chute 4 and the potato chips would be made and cooked while the customer waited. This would ensure that the customer received fresh potato chips, and would receive potato chips that were hot. In a continuous operation, the apparatus would be operated with freshly fried potato chips waiting for receipt of an order from a customer, or with a small inventory of packaged fresh potato chips.

Figure 2:
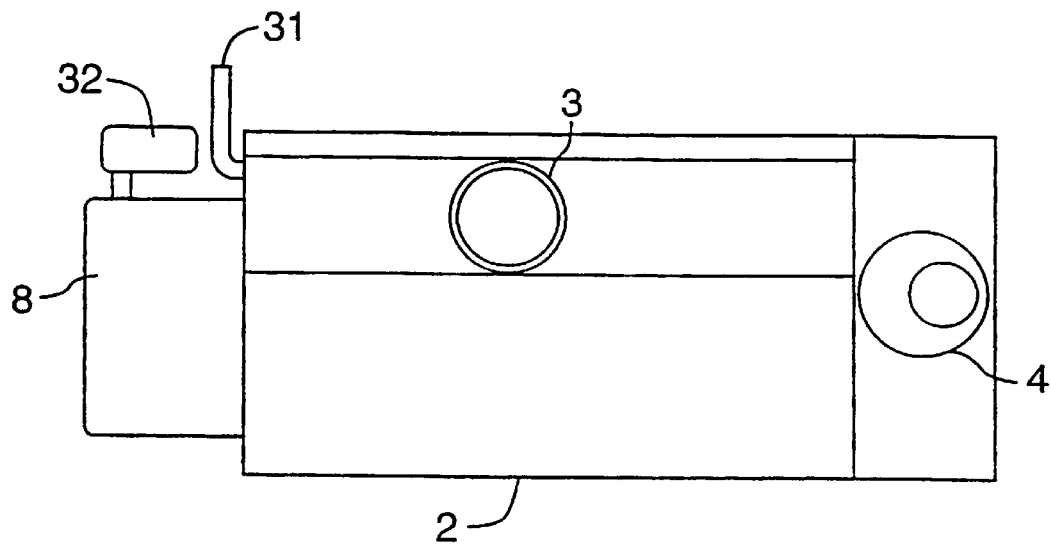
FIG. 2 is a schematic representation of the apparatus of FIG. 1 through A—A.

FIG. 2 shows the apparatus of FIG. 1 viewed from above, along A—A. Housing 2 has hood 3 extending upwards therefrom, with chute 4 located on one end and outlet conveyor chute 8 located on the opposed end. Motor 31 is shown extending from the side of housing 2, and is used to drive paddle wheels 20A, 20B within the apparatus, as well as used to drive the two submerging wheels, 21 and 22. An appropriate drive mechanism is used to drive the paddles and wheels. It is preferred that the paddle wheels rotate at a slightly slower rate than the submerging wheels, to reduce the likelihood of a jam of potato chips. It is to be understood that the paddles and wheels could be driven by different motors, preferably in a coordinated manner. Outlet conveyor chute 8 has outlet conveyor motor 32 extending therefrom, which is used to drive outlet conveyor 7.

In operation, motor 31 and conveyor motor 32 are variable speed motors and may be operated independently i.e. at different speeds, or the operation may be coordinated so that the rotation is the same or in a related manner. In a preferred embodiment, the operation of outlet conveyor motor 32 is controlled so that the chips have sufficient time to drain excess oil, optionally, to permit partial cooling of the chip, prior to being discharged from the apparatus. Thus, the operation of outlet conveyor motor 32 may be relatively independent of the temperature of the oil.

Figure 3:
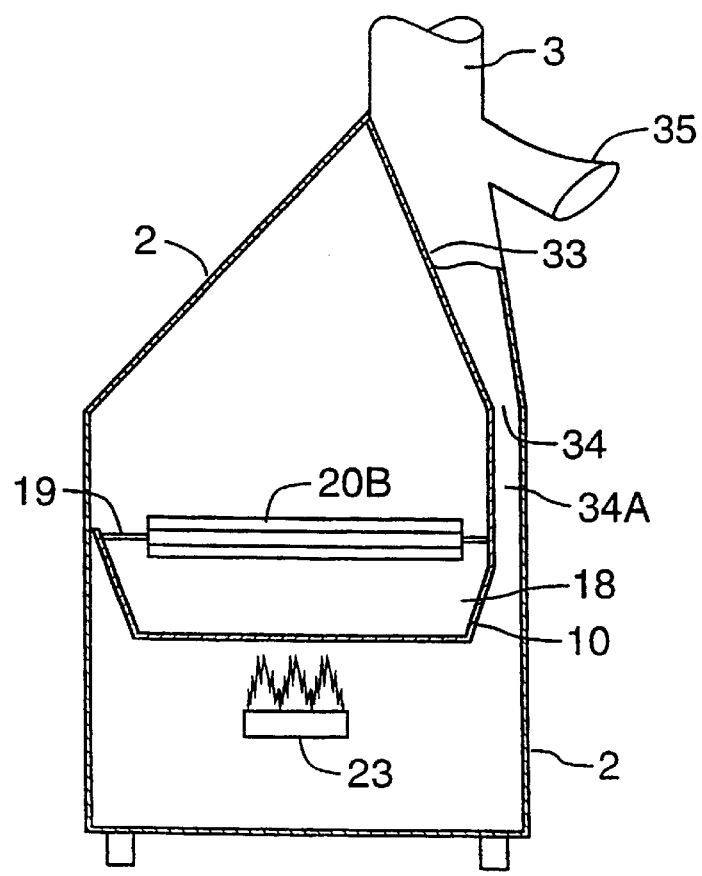
FIG. 3 is a schematic representation of the apparatus of FIG. 1 through B—B.

FIG. 3 shows a vertical section of the apparatus through B—B of FIG. 1. Oil heater 23 is located beneath oil pan 10, which contains oil 18. Paddle wheel 20 extends substantially across the width of housing 2 and is located at about, or slightly below, the level of oil surface 19.

Exhaust filter 33 is located above oil surface 19, substantially at the entrance to hood 3. In addition to exhaust filter 33, hood entrance 34 is provided for flow of heated gases.

In operation, heated air, oil fumes and other volatile matter passes from oil surface 19 of heated oil 18 in an upwards direction. This volatile matter passes through exhaust filter 33. It is intended that any entrained oil in the volatile matter be collected on exhaust filter 33 and flow downwardly along exhaust filter 33 so as to be returned to oil 10. Products of combustion from gas burner 23, including ambient air drawn from beneath the apparatus and which is used as supplementary air to achieve proper combustion of the gas, pass up through hood entrance 34 through duct 34A, and are exhausted through hood 3. Hood 3 may be provided with air inlet 35, through which ambient air may be drawn to cool gases passing through an exhaust fan (not shown) that is used for drawing gases from the apparatus. In addition, hood 3 would be provided with an appropriate fire extinguisher system (not shown) e.g. discharge vents through which fire retardant e.g. potassium carbonate in a liquid form or carbon dioxide from a remote cylinder, could be vented rapidly in the event of a fire.

It will be understood that the volume and temperature of gas permitted to pass through hood 3 must be controlled so that the apparatus fully complies with the pertinent government and municipal regulations with respect to exhausting of such gases. Appropriate flow dampers may be provided in the hood to control flow of gases, especially flow of gases from the burner and/or from oil 18.

In the event that an electric heat exchanger is used instead of a gas burner, venting of products of combustion from the gas burner would not be required, and alternate venting arrangements could be used.

Figure 4:
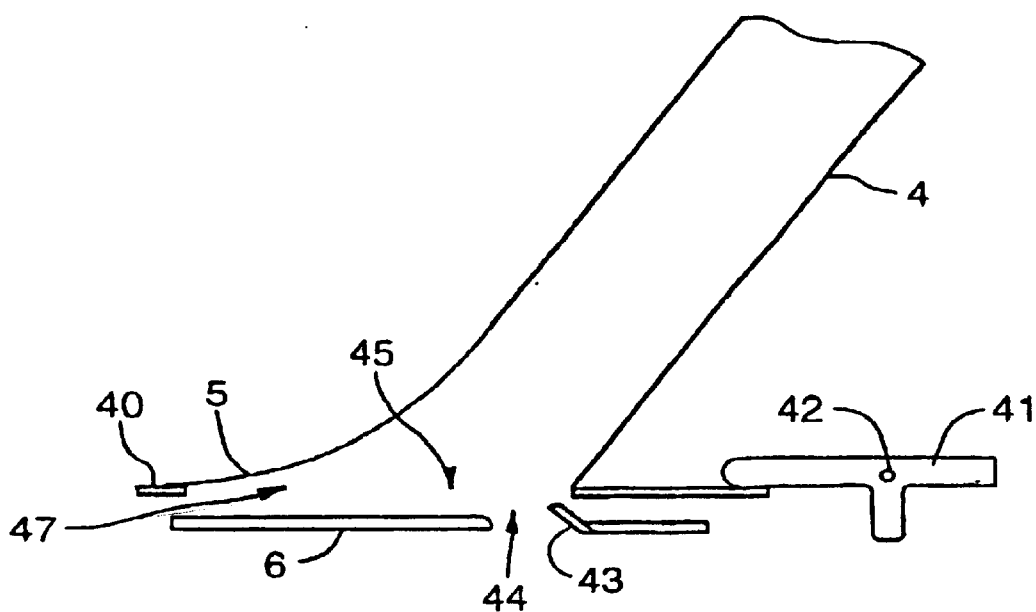
FIG. 4 is a schematic representation of a potato slicer.

FIG. 4 shows the chute and slicer used for the preparation of the potato chips. Chute 4 is shown as connected to chute plate 40. Adjacent to chute plate 40, chute 4 extends forwards in the direction of rotation of slicer blade 6, forming slicer base 5. In doing so, slicer base 5 forms an extended region, which preferably conforms to the shape of slicer hole 45, more clearly shown in the plan view of FIG. 5. Chute plate 40 is connected to plate handle 41 which pivots about plate pivot 42. Located beneath chute plate 40 is slicer 6, having knife blade 43 and slicer blade slot 44 therein. Slicer blade 43 and slicer blade 44 are co-operatively located beneath chute 4, being beneath slicer hole (orifice) 45. In preferred embodiments, slicer blade 44 is adjustable, so that the thickness of the potato slice may be adjusted.

Figure 5:
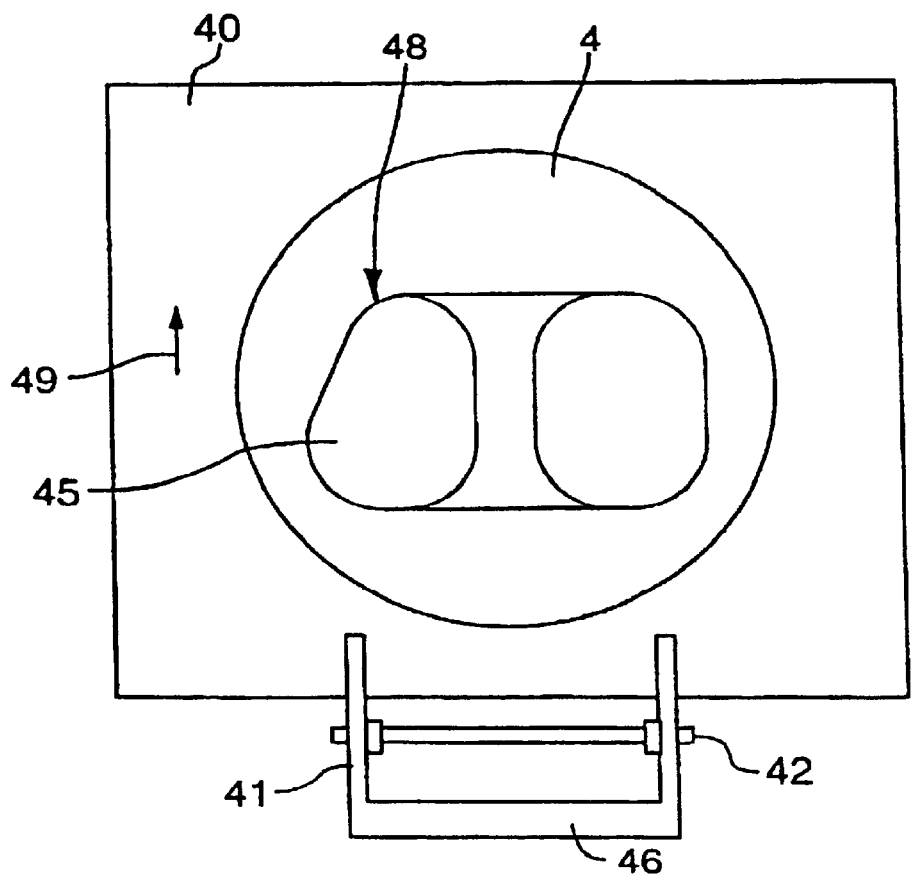
FIG. 5 is a schematic representation of the potato slicer of FIG. 4 in plan view.

FIG. 5 shows a plan view of the chute shown in FIG. 4. Plate handle 41 pivots about plate pivot 42, and conveniently has handle bar 46 thereon. Slicer hole 45 is shown in FIG. 5, and is located beneath chute 4, as shown in FIG. 4. While a variety of shapes of holes made be used for slicer hole 45, such shapes are generally a tapered ovate shape, e.g. pear shaped or tear drop shaped. Such shapes are characterized by a decreasing width in the direction of rotation of slicer blade 6, shown in FIG. 5. In the embodiment shown in FIG. 5, the forward part of orifice 45 is rounded or otherwise curved, but more rectilinear shapes may be used. It is an important feature that the shape of orifice 45 decrease in the direction of rotation of slicer blade 6, so that a potato in chute 40 is urged forward for ease of slicing. This prevents the potato, especially relatively small unsliced potato parts of the potato, to roll like ball bearings at the entrance to slicer hole 45, being turned by slicer blade 6 with minimal slicing of the potato. The urging forward tends to retain the potato in a position where it may be sliced by slicer blade 43. The end 48 of orifice 45 may be rounded or more pointed. In the preferred embodiment of the present invention, slicer hole 45 is in the shape of a tear drop, optionally a truncated tear drop or a tear drop with rounded point, for reasons discussed herein.

Although not shown in FIG. 5, a drive motor would be provided, to effect rotation of the sheer blade. In addition, a mechanism should be provided to reduce the speed of rotation of the slicer blade, when required.

In operation, a potato P is cleaned, or less preferably peeled and cleaned, and placed into chute 4. Potato P passes, by gravity, down chute 4 to the bottom thereof, On rotation of slicer 6, knife blade 43 cuts a slice from the bottom of the potato with the slice passing through slicer blade slot 44. Slicer hole 45 located at the bottom of chute 4 has a tapered shape, as indicated in FIG. 5. As discussed above, the narrower or pointed end is oriented in the direction of rotation of slicer 6, so that a potato in slicer hole 45 is urged towards the narrow end of the tear drop, becoming lodged therein to facilitate easy slicing of the potato.

Access to the slicer is achieved by applying pressure on handle bar 46, which pivots chute plate 40 upwards. Chute 40 may then be cleaned, as may slicer 6. Although not shown, safety interlocks should be provided to ensure that slicer 6 is not and cannot be rotated, except by hand, when chute plate 40 is moved upwards to open slicer 6.

Figure 6:
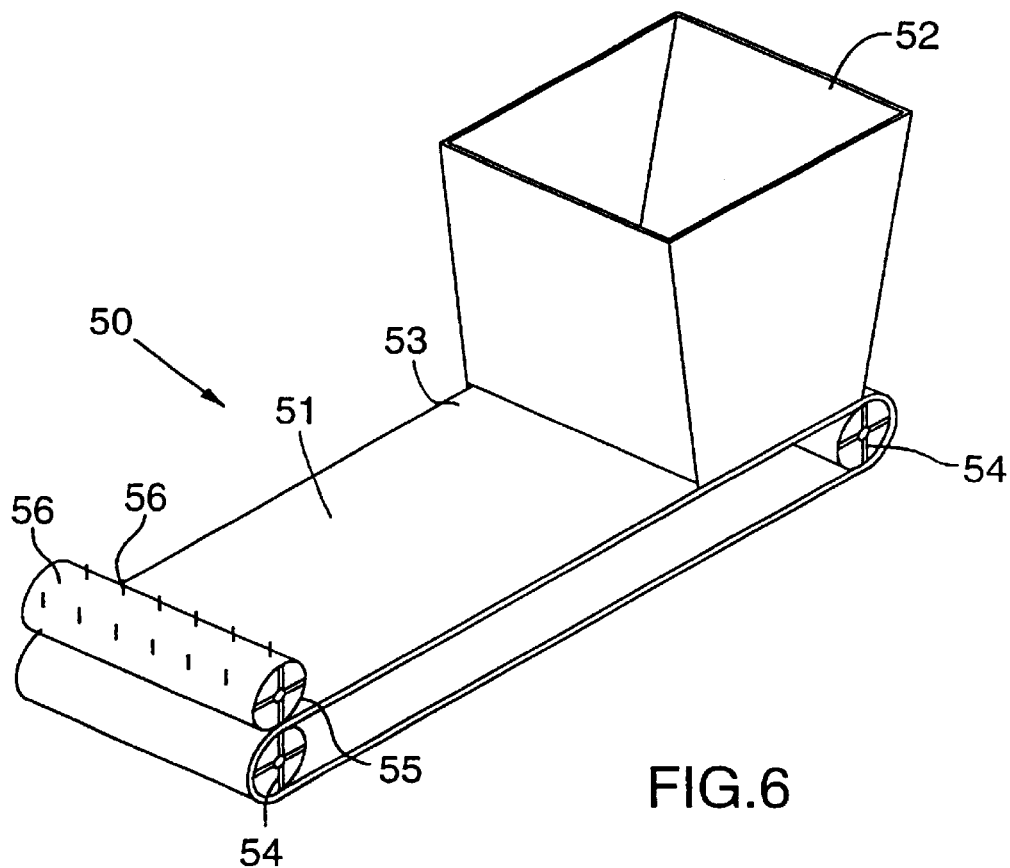

FIG. 6 shows an alternate feed mechanism for the apparatus of the invention that is particularly intended for use with other foodstuffs, especially corn chips or tortilla chips. It is intended that the feed mechanism of FIG. 6 could be located on the apparatus of the invention, at the location of the potato slicer. The potato slicer would be removed from the apparatus, e.g. by opening the potato slicer as described above with respect to FIG. 5. Typically, the potato slicer would be opened, with slicer blade being removed if necessary, and the alternate feed mechanism installed. It is particularly intended that such installation would be easily accomplished, to facilitate rapid changes, or the alternate feed mechanism would be permanently attached to the apparatus, and could be activated on opening of the slicer. Attachments for the alternate feed mechanism are not shown in FIG. 6, but will be apparent to persons skilled in the art.

In FIG. 6, the feed mechanism, 50, has a feed conveyor 51 with hopper 52 on the upper (inlet) end thereof. Hopper 52 has feed slot 53 located above feed conveyor 51, so that chips may flow from hopper 52 onto conveyor 51. Conveyor 51 is driven by drive wheels 54, using a motor (not shown).

At the lower or feed end of conveyor 51 is located roller 55, which would be spaced above conveyor 51 by a distance of at least the thickness of the chips to be fed. In addition, roller 55 has tynes 56 thereon. Tynes 56 would normally be formed from a soft rubbery material so as to not damage chips contacted by the tynes. It is preferred that the spacing between tynes 56 and conveyor 51 be approximately the thickness of the chips, or slightly less.

In operation, corn chips or tortilla chips, or such other chips or foodstuffs as are to be fried, are placed in hopper 52. With conveyor 51 operating, the chips are fed through feed slot 53 and along conveyor 51. While there may be a mono-layer of such chips, there will frequently be random stacking or multiple layers of chips. Tynes 56 on roller 55 facilitate the feeding of a single layer of chips from the end of conveyor 51, at which time the chips fall into oil 18 (not shown), and are processed as described above with respect to potato slices. It is understood that the rate of feed of corn chips, tortilla chips or such other foodstuffs being fed to the fryer would be controlled with respect to the temperature of the oil in the same manner as described above with reference to potato slices.

Figure 7:
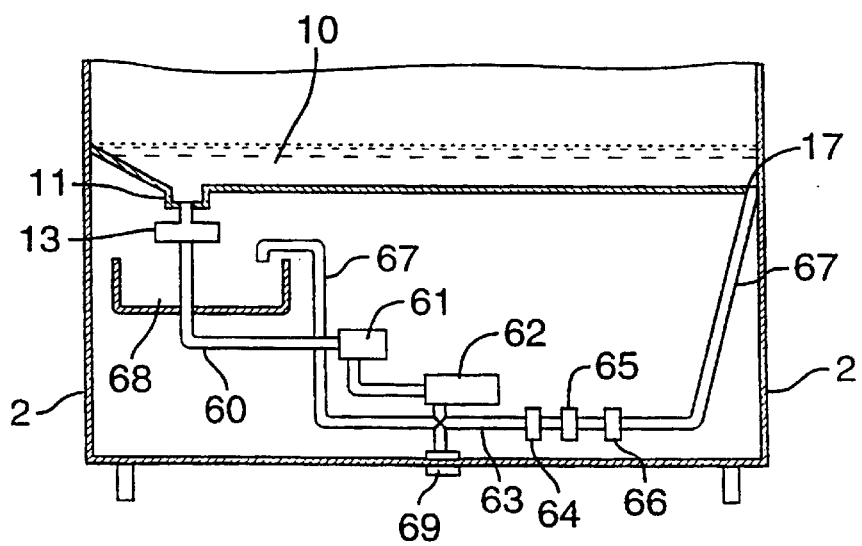
FIG. 7 is a schematic representation of a plumbing system.

FIG. 7 shows an alternate piping arrangement for use with oil pan 10. Oil pan 10 is connected to oil pan recess 11, as described above with respect to FIG. 1. Oil pan recess 11 is connected through pipe 60 and valve 61 to pump 62. From pump 62, pipe 63 is connected to thermocouples 64 and 65 and control valve 66, through pipe 67 to manifold 17. In addition, pump 62 is connected to drain 69 and to pipe 67. Pipe 67 feeds to holding tank 68.

In operation, oil 18 is circulated from oil pan 10 through filter 13 by pump 62. The oil is passed through pipes 63 and 67 to oil manifold 17. In pipes 63 and 67 are located thermocouples 64 and 65, for determining the temperature of the oil and for detection that the temperature has exceeded the pre-set maximum temperature. Safety valve 66 is a flow switch valve installed for safety in the event that the pumping system must be shut down.

For cleaning or other reasons, oil may be discharged through drain 69. Alternatively, especially for cleaning of the apparatus, the oil may be pumped through pipe 67 to holding tank 68.

The heating of the oil has been particularly described with reference to the use of gas burners 23. In one alternate method of heating the oil, the oil may be passed through a heat exchanger. In the heat exchanger, the oil may be heated directly with a heater. Alternatively, a shell and tube heat exchanger, or other types of heat exchanger, may be used to heat the oil. It is understood that any such heat exchanger would be equipped with appropriate drainage systems. Use of an electric heat exchanger is a preferred method of heating the oil.

The present invention provide a compact apparatus, and related method, for the provision of freshly fried potato chips, corn chips, tortilla chips or other foodstuffs. The apparatus is intended for use on demand, or continuously, and for location in fast food outlets, e.g. shopping malls, food stores, restaurants, stadiums, amusement parks and the like. The apparatus may be controlled to provide consistency in the fresh product obtained.

What is claimed is:

1. Apparatus for preparing potato chips, said apparatus having a slicer for the slicing of potatoes, a conveyor for conveying sliced potatoes through a heated oil bath, a remover for removal of cooked potato chips from the heated oil bath and a temperature monitor for measuring temperature of the oil bath, wherein said slicer comprises:

a knife blade adapted to slice potatoes that rotates at the lower end of a chute for potatoes, the sliced potatoes being fed to the heated bath, and an automatic controller for controlling the speed of rotation of the knife blade with respect to the temperature of the oil, wherein said controller automatically causes the knife blade to be stationary when the temperature of the oil bath is below a pre-determined temperature, and wherein said controller automatically causes the speed of rotation of the knife blade to increase as the temperature is increased above said pre-determined temperature.

2. The apparatus of claim 1 in which the knife blade is adapted to slice potatoes and feed each potato slice separately to the oil bath.

3. The apparatus of claim 1 in which the oil is adapted to be heated using an electric heat exchanger.

4. The apparatus of claim 1 in which the oil is adapted to be heated using gas.

5. The apparatus of claim 1 in which the slicer additionally comprises:

a rotatable disc having a radial slot therein and said knife blade projecting above the plane of said disc;

said chute downwardly conveying potatoes to said rotatable disc; and an orifice between said chute and said rotatable disc;

said chute having a region tapering and extending forwards in the direction of rotation of said disc, said orifice between said chute and said rotatable disc being at said region of said chute, said orifice having a shape that decreases in width in the direction of rotation of said rotatable disc.

6. The apparatus of claim 5 in which the orifice is in an ovate shape of decreasing width in the direction of rotation of the slicing blade.

7. The apparatus of claim 5 in which the chute is at an acute angle with respect to the direction of rotation of the disc.

8. The apparatus of claim 6 in which the chute terminates in a housing covering and conforming to the said ovate shape.

9. The apparatus of claim 5 in which the chute has an elbow therein.

10. A method for the preparation of potato chips in apparatus comprising a slicer for the slicing of potatoes, a conveyor for conveying sliced potatoes through a heated oil bath, a remover for removal of cooked potato chips from the heated oil bath and a temperature monitor for measuring temperature of the oil bath, said slicer comprising a knife blade that rotates at the lower end of a chute for potatoes, the knife blade being adapted to slice potatoes, and the sliced potatoes being fed to the heated bath, said method comprising:

in said step of slicing of potatoes, automatically controlling the speed of rotation of the knife blade with respect to the temperature of the oil so that said knife blade is stationary when the temperature of the oil bath is below a pre-determined temperature and the speed of rotation of said knife blade increases as the temperature is increased above said pre-determined temperature.

11. The method of claim 10 in which each of said sliced potatoes is fed separately to the oil bath.

12. The method of claim 10 in which said predetermined temperature is about 170° C.

13. The method of claim 12 in which the rotation of the knife blade ceases if the temperature increases to about 195° C. or above.

14. The method of claim 10 in which said slicer additionally comprises:

a rotatable disc having a radial slot therein and said knife blade projecting above the plane of the disc;

said chute downwardly conveying potatoes to said rotatable disc; and an orifice between said chute and said rotatable disc;

said chute having a region tapering and extending forwards in the direction of rotation of said disc, said orifice between said chute and said rotatable disc being at said region of the chute, said orifice having a shape that decreases in width in the direction of rotation of said rotatable disc;

said method additionally comprising feeding potatoes into said chute of said potato slicer, rotating said disc having the blade extending upwards therefrom by means of which each said potato to be sliced is urged into said region and sliced by said blade, submerging said sliced potato chip in said heated oil bath and removing said potato chip when cooked.

15. The method of claim 14 in which the orifice is an ovate shape of decreasing width in the direction of rotation of the blade.

16. The method of claim 14 in which each potato is fed separately to the chute.

17. The method of claim 14 in which the chute has an elbow therein.

18. Apparatus for preparing potato chips, said apparatus having a slicer for the slicing of potatoes, a conveyor for conveying sliced potatoes through a heated oil bath, a remover for removal of cooked potato chips from said heated oil bath and a temperature monitor for measuring temperature of said heated oil bath, wherein said slicer comprises:

a knife blade adapted to slice potatoes that rotates at the lower end of a chute for potatoes, said sliced potatoes being fed to said heated oil bath, and an automatic controller for controlling the speed of rotation of said knife blade and the speed of said conveyor with respect to the temperature of said heated oil bath, wherein said controller automatically causes said knife blade to be stationary when the temperature of said heated oil bath is below a pre-determined temperature, wherein said controller automatically causes the speed of rotation of said knife blade to increase as the temperature is increased above said pre-determined temperature, and wherein said controller automatically causes the speed of said conveyor to increase as the temperature of said heated oil bath increases above said pre-determined temperature.

19. The apparatus of claim 18 wherein said knife blade is adapted to slice potatoes and feed each potato slice separately to said heated oil bath.

20. The apparatus of claim 18 wherein said heated oil bath is adapted to be heated using an electric heat exchanger.

21. The apparatus of claim 18 wherein said heated oil bath is adapted to be heated using gas.

22. The apparatus of claim 18 wherein said slicer further comprises:

a rotatable disc having a radial slot therein and said knife blade projecting above the plane of said rotatable disc;

said chute downwardly conveying potatoes to said rotatable disc; and an orifice between said chute and said rotatable disc;

said chute having a region tapering and extending forwards in the direction of rotation of said rotatable disc, said orifice between said chute and said rotatable disc being at said region of said chute, said orifice having a shape that decreases in width in the direction of rotation of said rotatable disc.

23. The apparatus of claim 22 wherein said orifice is in an ovate shape of decreasing width in the direction of rotation of the knife blade.

24. The apparatus of claim 22 wherein said chute is at an acute angle with respect to the direction of rotation of said rotatable disc.

25. The apparatus of claim 23 wherein said chute terminates in a housing covering and conforming to the said ovate shape.

26. The apparatus of claim 22 wherein said chute has an elbow therein.

27. A method for the preparation of potato chips in apparatus comprising a slicer for the slicing of potatoes, a conveyor for conveying sliced potatoes through a heated oil bath, a remover for removal of cooked potato chips from said heated oil bath and a temperature monitor for measuring temperature of said heated oil bath, said slicer comprising a knife blade that rotates at the lower end of a chute for potatoes, said knife blade being adapted to slice potatoes, and said sliced potatoes being fed to the heated oil bath, said method comprising:

in said step of slicing of potatoes, automatically controlling the speed of rotation of said knife blade and the speed of said conveyor with respect to the temperature of said heated oil bath so that said knife blade is stationary when the temperature of said heated oil bath is below a pre-determined temperature, the speed of rotation of said knife blade increases as the temperature is increased above said pre-determined temperature and the speed of said conveyor increases as the temperature of said heated oil bath increases above said pre-determined temperature.

28. The method of claim 27 wherein each of said sliced potatoes is fed separately to said heated oil bath.

29. The method of claim 27 wherein said predetermined temperature is about 170° C.

30. The method of claim 27 wherein said rotation of said knife blade ceases if the temperature is at least about 195° C.

31. The method of claim 27 wherein said slicer further comprises:

a rotatable disc having a radial slot therein and said knife blade projecting above the plane of said rotatable disc;

said chute downwardly conveying potatoes to said rotatable disc; and an orifice between said chute and said rotatable disc;

said chute having a region tapering and extending forwards in the direction of rotation of said rotatable disc, said orifice between said chute and said rotatable disc being at said region of said chute, said orifice having a shape that decreases in width in the direction of rotation of said rotatable disc;

wherein said method further comprises feeding potatoes into said chute of said potato slicer, rotating said rotatable disc having said knife blade extending upwards therefrom by means of which each said potato to be sliced is urged into said region and sliced by said knife blade, submerging said sliced potato chip in said heated oil bath and removing said potato chip when cooked.

32. The method of claim 31 wherein said orifice is an ovate shape of decreasing width in the direction of rotation of said blade.

33. The method of claim 31 wherein each potato is fed separately to said chute.

34. The method of claim 31 wherein said chute has an elbow disposed therein.

* * * * *

UNITED STATES PATENT AND TRADEMARK OFFICE
CERTIFICATE OF CORRECTION

PATENT NO. : 6,602,533 B1 Page 1 of 1
APPLICATION NO. : 09/554345
DATED : August 5, 2003
INVENTOR(S) : Smith et al.

It is certified that error appears in the above-identified patent and that said Letters Patent is hereby corrected as shown below:

On the Title Page, Item -73-
Assignee line:
Should read --Chippery Potato Chip Factory, Inc.
        (A Delaware Company, USA)--

Signed and Sealed this

Nineteenth Day of August, 2008

JON W. DUDAS
*Director of the United States Patent and Trademark Office*